United States Patent [19]

Saegusa

[11] 4,429,969
[45] Feb. 7, 1984

[54] EXPOSURE CONTROL DEVICE OF CAMERA FOR FLASH EXPOSURE

[75] Inventor: Takashi Saegusa, Sagamihara, Japan

[73] Assignee: Nippon Kogaku K. K., Tokyo, Japan

[21] Appl. No.: 366,073

[22] Filed: Apr. 6, 1982

[30] Foreign Application Priority Data

Apr. 10, 1981 [JP] Japan ................................ 56-53131
Apr. 10, 1981 [JP] Japan ................................ 56-53132
Apr. 10, 1981 [JP] Japan ................................ 56-53133

[51] Int. Cl.³ .................. G03B 7/081; G03B 7/28; G03B 15/05
[52] U.S. Cl. .................. 354/414; 354/416; 354/418; 354/432
[58] Field of Search .................. 354/27, 31–35, 354/60 F, 127, 128, 139, 145, 149

[56] References Cited

U.S. PATENT DOCUMENTS

| | | | |
|---|---|---|---|
| 3,792,484 | 2/1974 | Tsujimoto et al. | 354/31 |
| 3,855,601 | 12/1974 | Uchiyama et al. | 354/31 |
| 4,007,469 | 2/1977 | Land et al. | 354/27 |
| 4,086,582 | 4/1978 | Kiyohara et al. | 354/33 |
| 4,306,787 | 12/1981 | Fukuhara et al. | 354/31 |
| 4,331,400 | 5/1982 | Brownstein et al. | 354/31 X |

*Primary Examiner*—William B. Perkey
*Attorney, Agent, or Firm*—Fitzpatrick, Cella, Harper & Scinto

[57] ABSTRACT

An exposure control device for use in a camera can judge, in response to information from light-measuring means on the luminance of natural light illumination in the object field and to information from a flash unit whether a flash light is required for the photographing of said object field, whether said photographing is made in the normal flash exposure mode or in the daylight flash exposure mode.

19 Claims, 9 Drawing Figures

| FIG. 3A | FIG. 3B |

| FIG. 4A | FIG. 4B |

EXPOSURE CONTROL DEVICE OF CAMERA FOR FLASH EXPOSURE

BACKGROUND OF THE INVENTION

1. Field of the Invention

The present invention relates to an exposure control device for use in a camera, and more particularly to an exposure control device adapted for photographing an object illuminated by flash light.

2. Description of the Prior Art

In general, photographing with a camera takes place in a natural light exposure mode for photographing an object under a natural light or a flash exposure mode for photographing an object illuminated by flash light. Said flash exposure mode is further divided into a normal flash exposure mode in which illumination is given to an object in an object field of a low luminance, and a daylight flash exposure mode in which illumination is given to a principal object showing a significant difference in luminance to the background in an object field under natural light illumination. In recent years there has been significant progress in the automation of the camera in order to facilitate photographing without failure in each exposure mode, so that the camera user is being released from the tedious preparations for photographing. Automatic exposure control is already achieved in the natural light exposure mode by an automatic exposure control device capable of controlling the shutter speed and diaphragm aperture for obtaining an appropriate exposure in response to the luminance of the object, and in the normal flash exposure mode by an automatic flash control device capable of controlling the amount of flash given to the object in such a manner as to obtain an appropriate exposure. Also for the daylight flash exposure mode there have been proposed various methods, as disclosed for example in the U.S. Pat. No. 3,792,484, of combining the automatic flash control device with the automatic exposure control device to obtain appropriate exposure for the principal object and the background in the object field. However such known methods are all based on the determination of necessity or intensity of flash illumination according to the luminance or luminance distribution of the object field and the control of a flash unit in response to said determination, and are designed to unconditionally select the natural light exposure mode or the flash exposure mode according to the state of luminance in the object field. It has however been unable, with such prior technologies, to constantly realize ideal exposures intended by the photographer in the various object fields actually encountered. For example in case of photographing a principal object representing a very small area in the entire object field, the flash exposure mode is not selected when the remaining background is of a high luminance, even if the principal object is of a low luminance requiring an artificial illumination. Also in the aforementioned daylight flash exposure mode, the exposure control has to be conducted in such a manner as to obtain an appropriate exposure for the principal object when it is illuminated by flash and simultaneously for the remaining background under the natural light illumination. In order to control the exposure in response to the luminance under natural light illumination in such daylight flash exposure mode, it is already known that a light measurement with plural photosensors corresponding to plurally divided areas in the object field generally provides a better result than a light measurement with a single photosensor.

However, in case a divided area contains a part of an extremely high luminance, for example a direct light from a light source, a part of low luminance also present in said divided area is masked by said high-luminance part, thus merely reducing the difference in luminance among said divided areas and failing to transmit the information on such low-luminance parts, particularly if the number of such divided areas is limited. Consequently an exposure control based on such light measurement will provide a deficient exposure for such low-luminance parts although an appropriate exposure is obtained for the high-luminance parts.

SUMMARY OF THE INVENTION

The principal object of the present invention is to provide an exposure control device for use in a camera and capable of constantly providing exposures intended by the photographer for the objects illuminated by flash.

The above-mentioned object is achieved according to the present invention by an exposure control device provided with means for judging, in response to information from light-measuring means on the luminance of natural light illumination in the object field and to information from a flash unit as to whether a flash light is required for the photographing of said object field, whether said photographing is made in the normal flash exposure mode or in the daylight falsh exposure mode.

Another object of the present invention is to provide a light-measuring device capable of measuring the luminances of plural divided areas in the object field and selectively providing plural output signals in response to the luminances of said divided areas, and further capable of selecting an optimum output signal for providing an appropriate flash exposure for the principal object from said plural output signals in response to the signal from said judging means.

DESCRIPTION OF THE PREFERRED EMBODIMENTS

Now the present invention will be clarified in detail by describing embodiments thereof.

Figure 1:
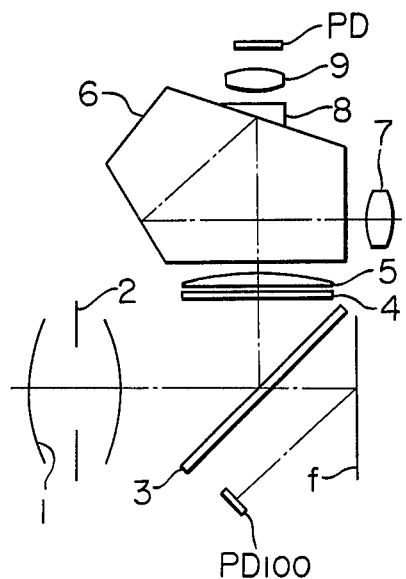
FIG. 1 is a schematic view showing a light-measuring system of a camera embodying the present invention.
Figure 2:
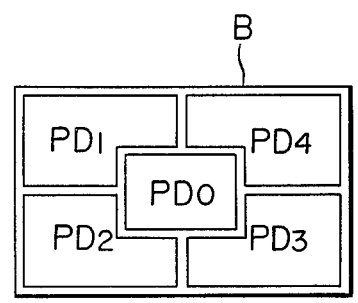
FIG. 2 is a plan view showing photosensors PD employed in the camera shown in FIG. 1.

Referring to FIG. 1 schematically showing a light-measuring system of a camera, the light from an object is guided through a picture-taking lens 1 and a diaphragm 2, then reflected by a mirror 3 and is focused on a focusing plate 4, and an image of the object thus formed thereon is observed through a condenser lens 5, a pentagonal roof prism 6 and an eyepiece lens 7. Also said image on the focusing plate 4 is focused on a photosensor or photodetector PD through a prism 8 adhered on a roof face of the prism 6 and a relay lens 9. Said photodetector PD has a pattern as shown in FIG. 2, composed of a photosensor element $PD_0$ for measuring the central area of the object field, photosensor elements $PD_1$, $PD_2$ for measuring the upper- and lower-left areas, and photosensor elements $PD_4$, $PD_3$ for measuring the upper- and lower-right areas, all being formed on a substrate B.

At the bottom of the camera there is provided a photosensor element $PD_{100}$ for receiving the light reflected by the photographic film after said mirror is lifted for exposure.

Figures 3, 3A:
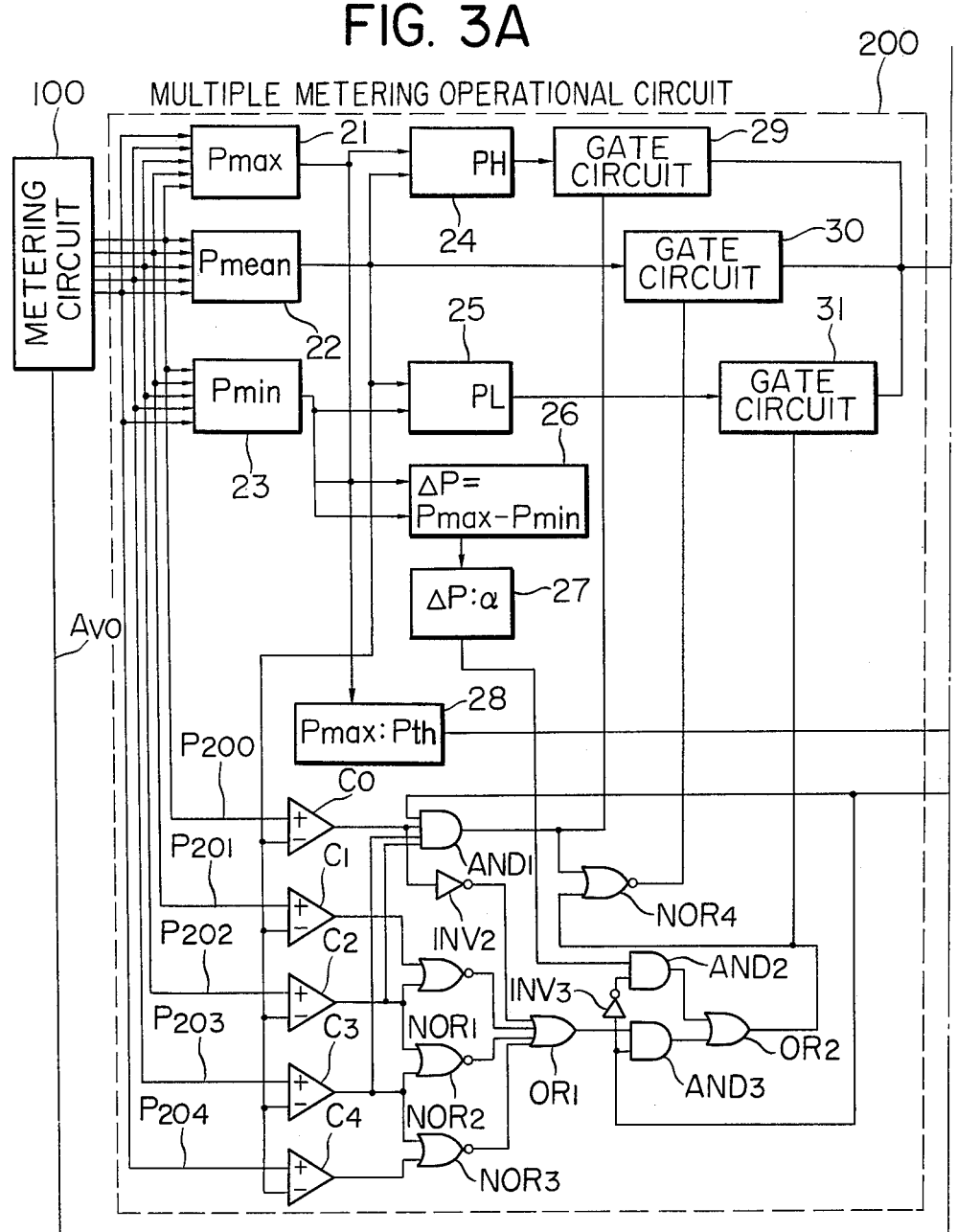
FIG. 3 composed of FIGS. 3A and 3B, is a circuit diagram of a first embodiment of the present invention.
Figure 3B:
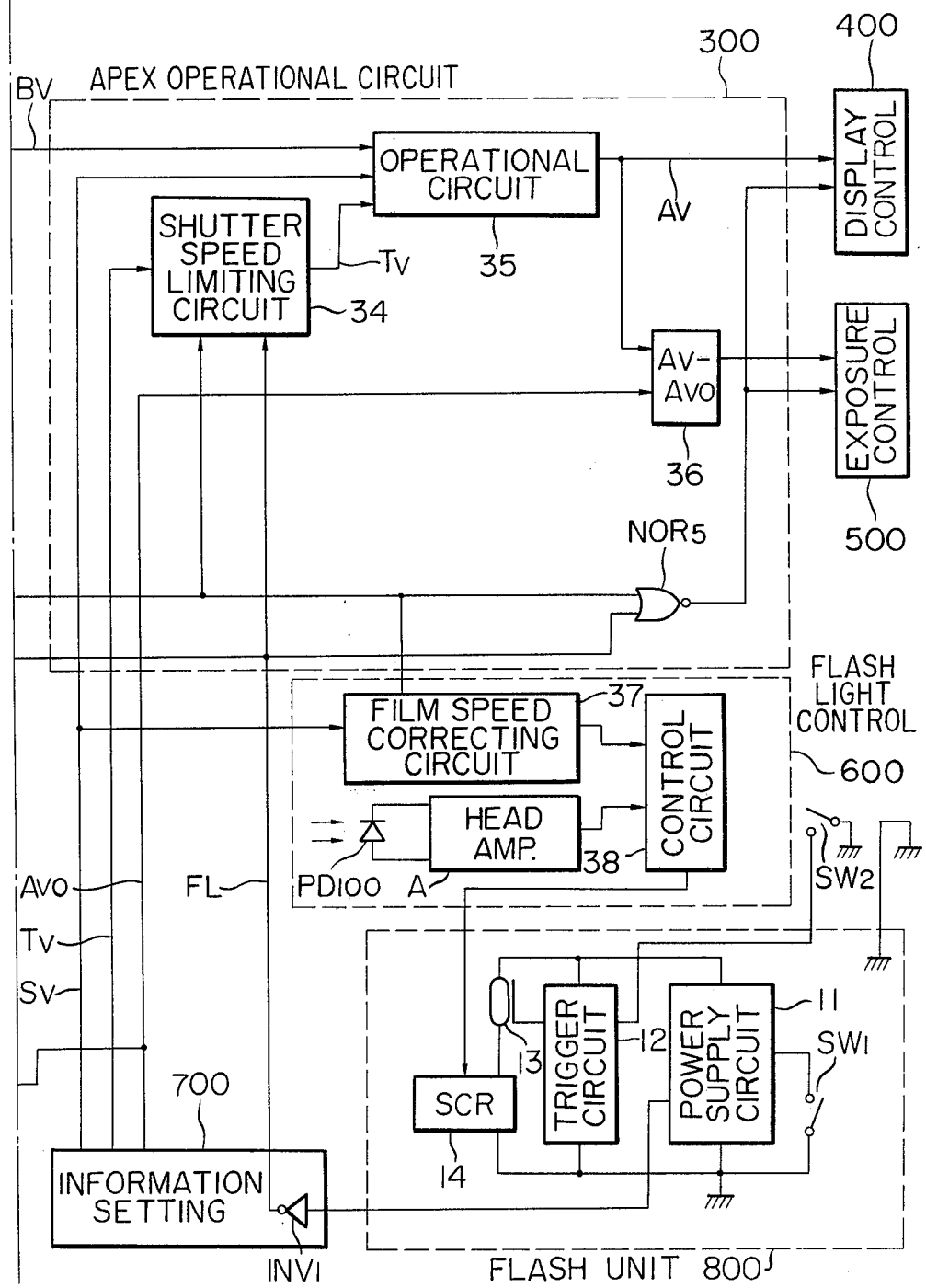

FIG. 3 shows a camera system representing an embodiment of the present invention applied to a camera with shutter-speed priority automatic exposure control.

Said camera system is composed of a camera comprising a light metering circuit 100; a multiple metering operational circuit 200; an APEX operational circuit 300; a display control unit 400; an exposure control unit 500; a flash control unit 600; and an information setting unit 700 for providing various data such as a flash setting signal FL, a lens full-aperture signal $Av_0$, a shutter speed signal Tv, a film sensitivity signal Sv etc., and of a flash unit 800 mounted on said camera. Said flash unit 800 is generally detachable from said camera and is made inactive upon detachment from the camera or upon turning off of a power switch Sw1.

The light metering circuit 100 is provided with plural photosensor elements shown in FIG. 2 and is capable of measuring the lights from plural areas divided in the object field, forming mutually independent light information signals P0-P4 respectively corresponding to the luminances of said divided areas, and adding the lens full-aperture signal $Av_0$ from said information setting unit 700 to said signals P0-P4 thereby generating luminance signals P200-P204.

The multiple metering operational circuit 200 generates a processed luminance signal Bv matching respective photographing condition, in response to the relative relationship of the luminance signals P200-P204 received from the metering circuit 100 and also to the flash setting signal FL received from the information setting unit 700.

The APEX operational circuit 300 performs an APEX calculation in response to the processed luminance signal Bv received from the operational circuit 200 and also to the signals $Av_0$, Tv, Sv and FL received from the information setting unit 700 and drives the display control unit 400 and the exposure control unit 500.

When a flash is given by the flash unit 800 after the lifting of the mirror 3 shown in FIG. 1, the flash control unit 600 measures the light transmitted through the lens 1 by the photosensor element PD100 and supplies the flash unit 800 with a flash terminating signal to terminate said flash when the measured light reaches a determined amount.

The flash unit 800, designed exclusively for a camera with through-the-taking-lens light metering, comprises a power switch Sw1, a power supply circuit 11, a trigger circuit 12, a flash tube 13, and an SCR circuit 14. The power supply circuit 11 releases an H-level signal to the information setting unit 700 of the camera when the power switch Sw1 is closed for photographing with the flash unit, and charges an unrepresented main condenser. After said charging, in response to the closing of a switch Sw2 in synchronization with the opening of an exposure aperture of the camera, the trigger circuit 12 initiates the discharge through the flash tube 13. When the flash reaches a determined amount, a flash terminating signal supplied from the flash control circuit 600 activates the SCR circuit 14 to terminate the flash from the flash tube 13.

The information setting unit 700 generates the flash setting signal FL by inverting the output signal from the power supply circuit 11 through an inverter INV1. When the flash unit is not in use, i.e. when it is detached from the camera or the power switch Sw1 is turned off, the flash setting signal FL is at the H-level since the power supply circuit 11 releases an L-level signal. On the other hand when the flash unit is in use, i.e. when it is mounted on the camera and the power switch Sw1 is turned on, the flash setting signal FL is at the L-level in response to the H-level signal from the circuit 11. The information setting unit 700 also generates signals representing the film sensitivity Sv, shutter speed Tv and full-aperture of the lens $Av_0$ in APEX representation.

The light metering circuit 100 adds the lens full-aperture signal $Av_0$ from the information setting unit 700 to the light information signal P0-P4 to provide the following output signals:

$$P_{200} = P_0 + Av_0$$

$$P_{201} = P_1 + Av_0$$

$$P_{202} = P_2 + Av_0\quad\quad\quad (1)$$

$$P_{203} = P_3 + Av_0$$

$$P_{204} = P_4 + Av_0$$

respectively constituting the luminance signal Bv for each divided area.

In the multiple metering operational circuit 200, a maximum detecting circuit 21 detects and releases a maximum value Pmax out of the output signal P200-P204 received from the metering circuit 100. A mean value calculating circuit 22 receives said output signals P200-P204 from the metering circuit 100 and calculates a mean value, for example:

$$P_{mean} = 1/5(P_{200} + P_{201} + P_{202} + P_{203} + P_{204}) \quad\quad (2)$$

A minimum detecting circuit 23 detects and releases a minimum value Pmin out of the output signals P200-P204 received from the metering circuit 100. An operational circuit 24 receives the maximum value Pmax and the mean value Pmean from the circuits 21, 22 and generates a first light metering signal:

$$PH(BV) = k_1 P_{max} + (1 - k_1) P_{mean} \quad\quad (3)$$

wherein $k_1$ is a constant. Also the output Pmean of the mean value calculating circuit 22 is utilized as a second light metering signal. An operational circuit 25 receives the mean value Pmean and the minimum value Pmin from the circuits 22, 23 and generates a third light metering signal:

$$PL = k_2 P_{min} + (1 - k_2) P_{mean} \quad\quad (4)$$

wherein $k_2$ is a constant. A luminance difference calculating circuit 26 receives the maximum signal Pmax from the circuit 21 and the minimum signal Pmin from the circuit 23 and calculates the difference in luminance:

$$\Delta P = P_{max} - P_{min} \quad\quad (5)$$

Said difference $\Delta P$, being in the APEX representation which is the subtraction of logarithms of luminances, indicates the ratio of the maximum and minimum luminances. A comparator circuit 27 compares said difference $\Delta P$ with a reference value $\alpha$ and generates an L-level output signal in case of:

$$\Delta P \geq \alpha \quad (6)$$

or an H-level output signal in case of:

$$\Delta P < \alpha \quad (7)$$

A comparator circuit 28 compares the output Pmax from the circuit 21 with a reference value Pth and accordingly identifies, in case of a flash exposure mode, whether to adopt the daylight flash exposure mode for a dark object in a lighter background or to adopt the normal flash exposure mode for a generally dark object field. Said output signal Pmax is suitable for making said identification since it is most strongly influenced by the light sources in the object field. However the output Pmean may be employed for this purpose instead of Pmax. The reference value Pth is seleted for example corresponding to EV8−10 (ASA 100). In case of:

$$P\text{max} \geq P\text{th} \quad (8)$$

the comparator circuit 28 generates an H-level output signal indicating that the object field is light, so that the daylight flash exposure mode should be selected if a flash illumination is to be used. In such case the amount of flash should be controlled in consideration of the light other than that from the flash tube, namely the natural illumination.
In case of:

$$P\text{max} < P\text{th} \quad (9)$$

the comparator circuit 28 generates an L-level output signal indicating a dark object field, so that the normal flash exposure mode should be employed if a flash illumination is to be used. In such case no consideration is required for the influence of the natural light. Comparators C0–C4 respectively receiving the aforementioned output signals P200–P204 at the non-inverted input ports and the output signal Pmean of the circuit 22 at the inverted input ports, generate H-level or L-level signals respectively indicating whether said output signals P200–P204 are higher or lower than Pmean, thus giving the relative luminance information on the divided areas of the object field. Logic circuits composed of an AND gate AND1, and inverter INV2, NOR gates NOR1–NOR4, an OR gate OR1, an inverter INV3, AND gates AND2–AND3 and an OR gate OR2 receive the differential luminance information from said comparators C0–C4, the differential luminance signal from the comparator circuit 27 and the flash setting signal FL from the information setting unit 700 and accordingly activates a gate 29, 30 or 31, thereby selecting one of the output signal PH from the circuit 24, the output signal Pmean from the circuit 22 and the output signal PL from the circuit 25 as the output signal Bv of the multiple metering operational circuit 200 according to the photographing condition.

The function of the above-explained circuit for each mode will be explained in the following.
Photographing without flash illumination:

In this mode the H-level flash setting signal FL from the information setting unit 700 is supplied to the gate AND2 after inversion by the inverter INV3 so that said gate AND2 provides an L-level signal regardless of the output signal from the comparator circuit 27. Said H-level flash setting signal FL is also supplied to the gate AND3, whereby said gate AND3 and the gate OR2 transmit the output signal from the gate OR1. Said H-level flash setting signal is further supplied to the gate AND1.

(1) Photographing without flash of an object field in which the central and lower areas corresponding to the photosensor elements PD0, PD2 and PD3 are lighter:
In such state, wherein the conditions:

$$P200 \geq P\text{mean}$$
$$P202 \geq P\text{mean} \quad (10)$$
$$P203 \geq P\text{mean}$$

are satisfied, the principal object is identified to be in a lighted area and the output signal PH, matching the luminance of said principal object, is selected as the output signal Bv of the operational circuit 200.

In this case said circuit 200 functions in the following manner.

Since the photosensor elements PD0, PD2, PD3 correspond to the lighter areas, the comparators C0, C2, C3 provide H-level signals to the gate AND1, which also receives the H-level flash setting signal FL and releases an H-level signal to the gate 29 to transmit the output signal PH from the circuit 24. At the same time the comparator C0 releases an H-level signal which is inverted to the L-level by the inverter INV1. Also the comparators C2, C3 provide H-level signals which provide L-level signals from the gates NOR1–NOR3. Consequently the gate OR1, receiving all L-level input signals, provides an L-level signal. As explained in the foregoing, the output signal from the gate OR2 is same as that from the gate OR1 when the flash setting signal FL is at the H-level, so that said gate OR2 also provides an L-level signal. Furthermore the H-level output signal from the gate AND1 releases an L-level signal from the gate NOR4. Thus the gates 30, 31 receiving the L-level signal from the gates NOR4 and OR2 are closed to intercept the output signals Pmean, Pmin from the circuits 24, 25. In this manner the output signal PH from the circuit 24 alone is obtained the gate 29 as the output signal from the multiple metering operational circuit 200.

(2) Photographing without flash of an object field in which:
(a) the central area corresponding to the photosensor element PD0 is dark, satisfying a condition:

$$P200 \leq P\text{mean} \quad (11);$$

(b) the left-hand areas corresponding to the photosensor elements PD1, PD2 are dark, satisfying conditions:

$$P201 \leq P\text{mean}$$
$$P202 \leq P\text{mean} \quad (12);$$

(c) the lower areas corresponding to the photosensor elements PD2, PD3 are dark satisfying conditions:

$$P202 \leq Pmean$$

$$P203 \leq Pmean \quad (13);$$

or (d) the right-hand areas corresponding to the photosensor elements PD3, PD4 are dark, satisfying conditions:

$$P203 \leq Pmean$$

$$P204 < Pmean \quad (14)$$

the judgement is conducted in the following manner.

In the case (a), the central area of the field, where the principal object generally exists, is dark. The case (c) is identified as a back-lighted object, where the luminance of the principal object is close to that of the darker areas at the lower part of the field. The case (b) or (d) is identified as a back-lighted object with the camera in the vertical position, where P201 and P202 or P203 and P204 represent the luminances of the lower areas and where the luminance of the principal object is close to that of the darker lower areas.

In these cases (a)–(d) in which the principal object is in a dark area, the output signal PL, matching the luminance of the principal object, is given as the output signal Bv of the multiple metering operational circuit 200.

Said circuit 200 functions in the following manner in these cases (a)–(d).

In the case (a) where the output signal P200 is at the L-level, the comparator C0 releases an L-level output signal to obtain H-level signals from the inverter INV2, and gates OR1, OR2. Thus the gate 31, receiving the H-level signal from the gate OR2, transmits the output signal PL from the circuit 25. On the other hand the H-level output signal from the gate OR2 releases an L-level signal from the gate NOR4 and the L-level signal from the comparator C0 releases an L-level signal from the gate AND1, whereby the gates 29, 30 receiving the L-level signals from the gates AND1 and NOR4 intercept the output signals PH, Pmean from the circuits 24, 22. In this manner the output signal PL of the circuit 25 alone is given as the output signal Bv of the multiple metering operational circuit 200.

In the case (b), where the output signals P201, P202 are at the L-level, the comparators C1, C2 generate L-level output signals to release an H-level signal from the gate NOR1.

In the case (c), where the output signals P202, P203 are at the L-level, the comparators C2, C3 generate L-level output signals to release an H-level signal from the gate NOR2.

In the case (d), where the output signals P203, P204 are at the L-level, the comparators C3, C4 generate L-level output signals to release an H-level signal from the gate NOR3.

In these cases (b)–(d), the gate OR1 receiving the H-level signal from one of the NOR gates NOR1–NOR3 releases an H-level signal, whereby the gate OR2 also releases an H-level signal, in response to which the gate 31 transmits the output signal PL from the circuit 25. Also the gate NOR4 receiving the H-level output signal from the gate OR2 releases an L-level signal whereby the gate 30 intercepts the signal Pmean from the circuit 22. Also in said cases (b)–(d), the comparator C2 and/or the comparator C3 releases an L-level output signal to the gate AND1 which therefore releases an L-level signal constantly to the gate 29, thereby intercepting the output signal PH from the circuit 24. In this manner the output PL of the circuit 25 alone is obtained as the output signal Bv from the multiple metering operational circuit 200.

(3) Photographing without flash other than the aforementioned cases (1) and (2);

The gates AND1 and OR2 both supply L-level signals to the gate NOR4 which thus releases an H-level signal thereby transmitting the output signal Pmean from the circuit 22 through the gate 30. On the other hand the circuits 29, 30 receiving the L-level signals from the gates AND1 and OR2 interrupt the output siganls PH, PL from the circuits 24, 25. In this manner the output signal Pmean alone is obtained as the output signal Bv from the multiple metering operational circuit 200.

In the photographing mode with flash, the power switch Sw1 of the flash unit 800 is turned on to generate an H-level signal from the power supply circuit 11. Said signal is inverted to the L-level by the inverter INV1 of the information setting unit 700 to generate an L-level flash setting signal FL from said unit. Because of said signal FL, the gate AND3 releases an L-level signal regardless of the output signal from the gate OR1, thereby intercepting said output signal. Also said flash setting signal FL is supplied, after inversion to the H-level by the inverter INV3, to the gate AND2, so that the output signals from the gates AND2 and OR2 become equal to that from the comparator circuit 27. Also the L-level flash setting signal FL is supplied to the gate AND1 to obtain an L-level signal regardless of the output signals from the comparators C0, C2 and C3.

(1) In case the photographer recognizes the necessity of flash illumination for the object and the difference ΔP of the luminance in the object field is smaller than the reference value α, thus satisfying the relation (7), the object field may be under an extremely backlighted condition. Under such a situation for which the daylight flash exposure mode is selected, the information of light measurement may not be obtained from the principal object of a low luminance in case the area of said principal subject contains a part of an extremely high luminance such as the direct light from a light source. In such situation, therefore, the exposure should preferably be adjusted to the low luminance part rather than to the high luminance part. For this reason the output signal PL is selected as the output signal Bv of the multiple metering operational circuit 200 in such case.

Thus, under the situation of relation (7), the comparator circuit 27 releases an H-level output signal, and, as explained before, the gate OR2 releases the same H-level signal which is received by the gate 31 to transmit the output signal PL from the circuit 25. On the other hand the gate NOR4, receiving the H-level signal from the gate OR2, releases an L-level signal. Also the gate AND1 releases an L-level signal as explained in the foregoing. Consequently the gates 29, 30, receiving the L-level signals from said gates AND1 and NOR4, intercept the output signals PH, Pmean from the circuits 24, 22. In this manner the output signal PL from the gate 31 alone is obtained as the output signal Bv from the multiple metering operational circuit 200.

(2) In case the photographer recognizes the necessity of flash illumination for the object and the difference ΔP of the luminance in the object field is large enough to satisfy the relation (6), the principal object is usually in a dark part of an object field requiring the daylight flash exposure mode. In such situation, therefore, it is preferable to use flash illumination for the principal object to obtain an appropriate exposure, and to give an average exposure to the background of a higher luminance in order to avoid excessive exposure. For this reason the output signal Pmean is selected in this case as the output signal Bv from the multiple metering operational circuit 200.

Thus, under the situation of relation (6), the comparator circuit 27 release an L-level signal, whereby the gates AND2 and OR2 generate L-level signals. Consequently the gate NOR4 releases an H-level signal to transmit the signal Pmean from the circuit 12 through the gate 30. On the other hand the gates 29, 31, receiving the L-level signals from the gates AND1 and OR2, intercept the output signals PH, PL from the circuits 24, 25. In this manner the output signal Pmean from the circuit 22 is selected in this case as the output signal Bv of the multiple metering operational circuit 200.

The APEX operational circuit 300 performs an APEX processing on the luminance signal PH, Pmean or PL from the multiple metering operational circuit 200 and the film sensitivity signal Sv, shutter speed signal Tv, lens full-aperture signal $Av_0$ and falsh setting signal FL from the information setting unit 700 according to the selected exposure mode, and controls the display control unit 400 and the exposure control unit 500 in response to the result of said processing.

A shutter speed limiting circuit 34 receives the shutter speed signal Tv and flash setting signal from the information setting unit 700 and the output signal from the comparator circuit 38, and transmits said shutter speed signal Tv to an operational circuit 35 without any change in case the flash setting signal FL is at the H-level, indicating that the flash illumination is not in use. On the other hand, in case the flash illumination is to be used, the shutter speed limiting circuit 34 applies the following limitation to the shutter speed signal Tv from the information setting unit 700. In the normal flash exposure mode in which the relation (9):

$$Pmax < Pth$$

is satisfied, the comparator circuit 28 generates an L-level signal, in response to which the shutter speed limiting circuit 34 fixes the shutter speed signal Tv at a fastest shutter speed Tvx synchronizable with the flash from the flash unit and transmits said shutter speed to the operational circuit 35. Said fastest synchronizable shutter speed Tvx is selected since a longer exposure is not necessary in the normal flash exposure mode. Then, in the daylight flash exposure mode in which the relation (8):

$$Pmax \geq Pth$$

is satisfied, the comparator circuit 28 generates an H-level signal, in response to which the shutter speed limiting circuit 34 limits the shutter speed Tv to an exposure longer than the fastest synchronizable shutter speed Tvx and transmits thus limited shutter speed to the operational circuit 35.

The operational circuit 35 receives the shutter speed signal Tv from the shutter speed limiting circuit 34, the film sensitivity signal Sv from the information setting unit 700 and the luminance signal Bv (i.e. PH, Pmean or PL) from the multiple metering operational circuit 200 and performs an APEX processing:

$$Bv + Sv - Tv = Av \tag{15}$$

to obtain a diaphragm aperture control signal Av. In response to said signal, the display control unit 400 displays the corresponding diaphragm aperture. Another operational circuit 36 receives said diaphragm aperture control signal Av from the operational circuit 35 and the lens full-aperture signal $Av_0$ from the information setting unit 700 to perform calculation:

$$(Av) - (Av_0) = (Av - Av_0) \tag{16}$$

and transmits the aperture steps $(Av-Av_0)$ to the exposure control unit 500, whereby said unit closes the diaphragm aperture by the indicated number of steps after the shutter release operation. There is provided a NOR gate NOR5 for receiving the flash setting signal FL from the information setting unit 700 and the output signal from the comparator circuit 28. In the normal flash exposure mode, where the flash setting signal FL is at the L-level and the relation Pmax<Pth is satisfied, the comparator circuit 28 releases an L-level signal in response to which the gate NOR5 supplies an H-level signal to the display control unit 400 and the exposure control unit 500. In this situation the display control unit 400 displays the fastest synchronizable shutter speed Tvx and the exposure control unit 500 performs the corresponding exposure control, regardless of the output signal from the operational circuit 35. In other modes, i.e. in the natural light exposure mode and in the daylight flash exposure mode, the gate NOR5 generates an L-level output signal whereby the display control unit 400 and the exposure control unit 500 function according to the output signal from the operational circuit 35.

In the flash control unit 600, a light-metering head amplifier A is provided with a photosensor element PD100 for flash output control. Referring again to FIG. 1, after the mirror 3 is lifted in the photographing operation, the photosensor element PD 100 measures the light transmitted through the lens 1 and reflected by the photographic film f, and supplies a corresponding output signal to a control circuit 38 through the head amplifier A. A film speed correcting circuit 37 receives the output signal from the comparator circuit 33 and the film sensitivity signal Sv from the information setting unit 700. In the normal flash exposure mode in which the condition Pmax<Pth is satisfied and the output signal from the comparator circuit 28 is at the L-level, said film speed correcting circuit 37 transmits the film sensitivity signal Sv to the control circuit 38 without any change. Said circuit 38 generates a flash terminating signal to the SCR circuit 14 to interrupt the flash when the flash from the flash unit reaches a determined amount, in response to the film sensitivity signal Sv and the output signal from the light-metering head amplifier A. In the daylight flash exposure mode, in which the condition Pmax≧Pth is satisfied and the output signal from the comparator circuit 28 is at the H-level, the film speed correcting circuit 37 performs the following correction on the film sensitivity signal Sv:

$$(Sv) + (\delta) = (Sv + \delta) \tag{17}$$

wherein δ is selected for example in a range from ⅔ to 2 [EV] in consideration of the natural light. In response to thus corrected film sensitivity signal (SV+δ), the control circuit 38 generates the flash terminating signal earlier by a period corresponding to δ than in the case without said correction for the film sensitivity, thereby interrupting the flash from the flash unit 800.

In the present embodiment, in photographing a backlighted principal object with the daylight flash exposure mode, the duration of the flash is reduced by an amount δ corresponding to the natural light, thereby preventing the principal object from excessive exposure.

It is also possible to increase the correction δ, thereby decreasing the flash from the flash unit and reproducing the principal object with a rather deficient exposure. In this manner it is rendered possible to automatically obtain a photograph adequately showing the backlighted atmosphere.

Furthermore a correction for increasing the amount of flash is useful in certain cases. For example in a camera with so-called direct light metering system in which the automatic exposure control is achieved by measuring the light reflected by the film or the shutter curtain both in the natural light exposure mode and in the normal flash exposure mode, the integration of said light measurement is started after the start of the displacement of the leading shutter curtain but before the completion of said displacement. For this reason the amount of flash from the flash unit is suppressed by an amount corresponding to the natural light to be integrated from the start of said integration to the completion of said displacement of the leading shutter curtain or to the start of flash, so that the principal object is under exposed. In such case the correction is made to increase the amount of flash from the flash unit.

Now there will be given a further explanation on the operation sequence in case of the daylight flash exposure mode. At the flash unit 800 is mounted on the camera, and the power switch Sw1 is turned on, so that the power supply circuit 11 initiates the charging of the main capacitor. When the voltage across said condenser reaches a dischargeable level for the flash tube, the power supply circuit 11 supplies an H-level signal to the information setting unit 700, which inverts said signal to the L-level by the inverter INV1 thereby generating an L-level flash setting signal FL.

Then in response for example to a half-push of the shutter release button, the metering switch is closed to activate the light metering circuit 100. In the multiple metering operational circuit 200, in case the difference of luminance in the object field is small enough to satisfy the condition $\Delta P = P_{max} - P_{min} < \alpha$, the third light-metering output signal PL is obtained by the differential luminance calculating circuit 26, comparator circuit 27, comparators C0–C4 and logic circuits AND1, INV2, NOR1–NOR4, OR1, INV3, AND2, AND3 and OR2 and is supplied to the APEX operational circuit 300 together with the film sensitivity signal Sv, shutter speed signal Tv and lens full-aperture signal $Av_0$ from the information setting unit 700, whereby said APEX operational circuit 300 conducts an APEX calculation and generates the diaphragm aperture controlling signal Av.

Then in response to the fullpush of said shutter release button, the shutter mechanism is released to initiate the photographing operation.

Upon lifting of the mirror 3 shown in FIG. 1, the light transmitted by the lens 1 no longer reaches the photosensor PD, so that the aforementioned luminance signal Bv is latched immediately before said mirror lifting. Based on said latched signal the operational circuit 35 performs the above-mentioned calculation to provide the diaphragm aperture controlling signal Av. The display control unit 400 displays said aperture Av and the exposure control unit 500 reduces the diaphragm aperture corresponding to the signal $(Av - Av_0)$.

When the leading shutter curtain starts displacement and fully opens the exposing aperture, the flash control circuit 38 initiates the integration of the output signal from the light-metering head amplifier A. Simultaneously the synchronizing switch Sw2 is closed to start the discharge through the flash tube 13 by means of the trigger circuit 12.

In the daylight flash exposure mode, the sensitivity correcting circuit 37 transmits a corrected signal (Sv+δ) to the control circuit 38, which therefore supplies a flash terminating signal to the SCR circuit 14 earlier corresponding to said signal δ than in the normal flash exposure mode in which said correction is not made, whereby the flash tube 13 terminates the discharge.

Subsequently the trailing shutter curtain starts displacement to close said exposing aperture.

In this manner an appropriate exposure is given to the background by the exposure control unit 500, and an appropriate exposure is also given to the principal object by a flash of which duration is controlled by the control circuit 38.

Figure 5:
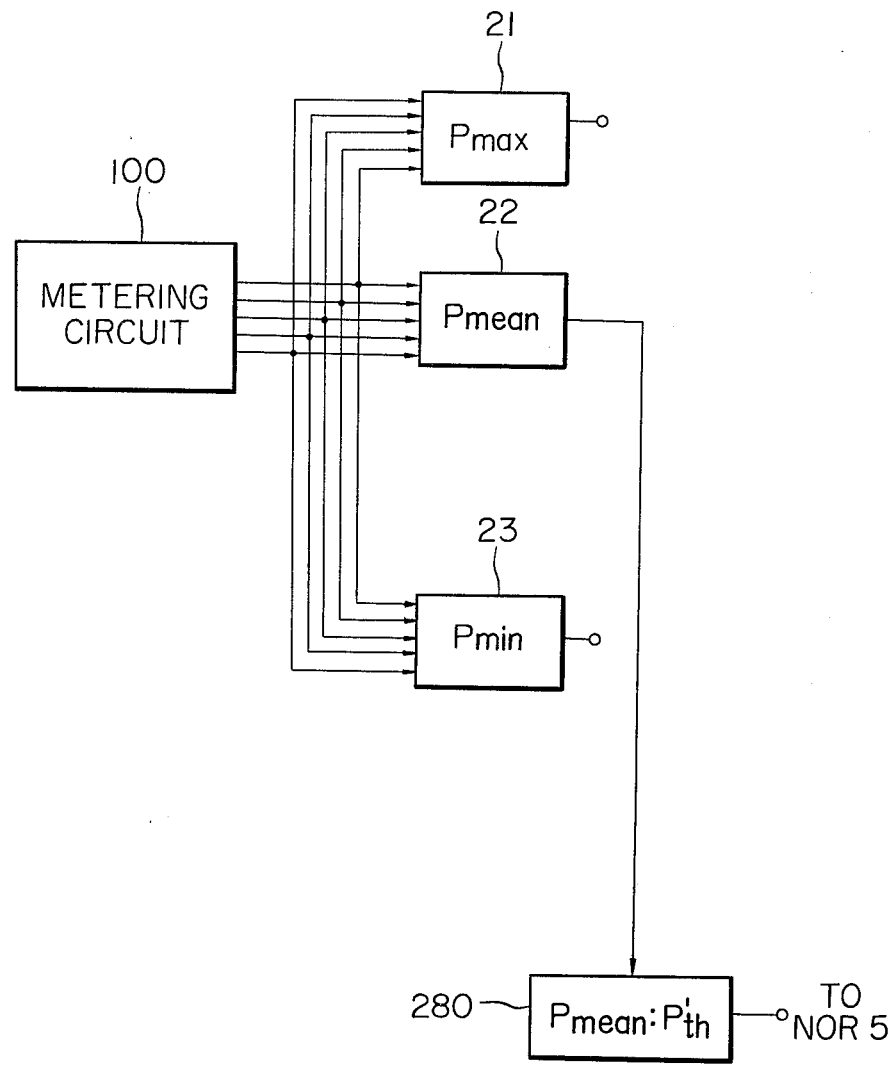
FIG. 5 is a circuit diagram showing a variation to the embodiments shown in FIGS. 3 and 4.

In the foregoing embodiment the comparator circuit 28 compares the Pmax from the maximum detecting circuit 21 with the reference value Pth, but a same effect is also obtained by comparing the output Pmean from the mean value calculating circuit 22 with the reference value Pth' is shown in FIG. 5. In such case said reference value Pth' is lower than the aforementioned reference value Pth and is selected in a range of Ev 7–8 for a sensitivity of ASA 100.

In such case the daylight flash exposure mode is selected for a condition:

$Pmean \geq Pth'$ and the normal flash exposure mode is selected for a condition:

$Pmean < Pth'$.

Figures 4, 4A:
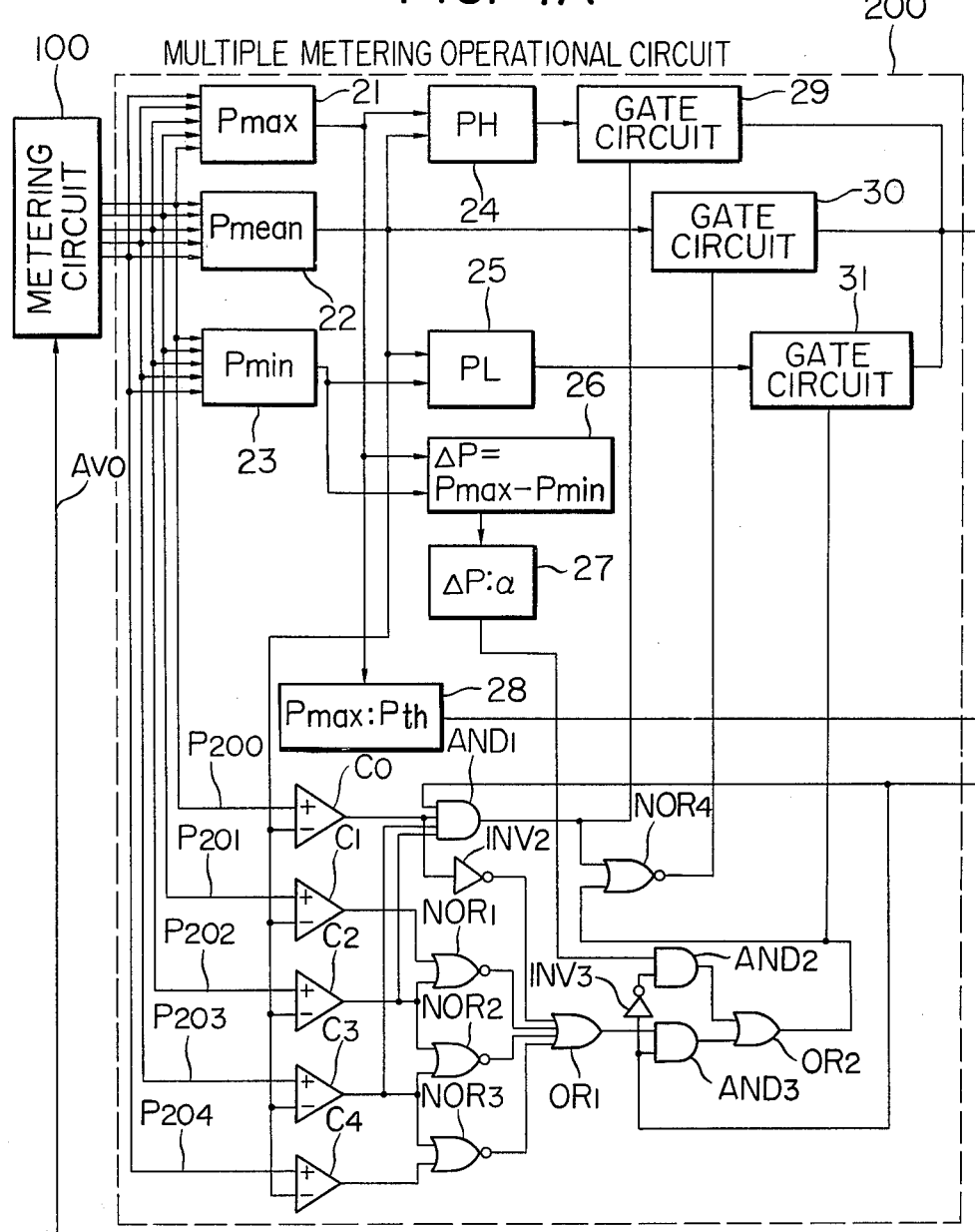
FIG. 4 composed of FIGS. 4A and 4B, is a circuit diagram of a second embodiment of the present invention.
Figure 4B:
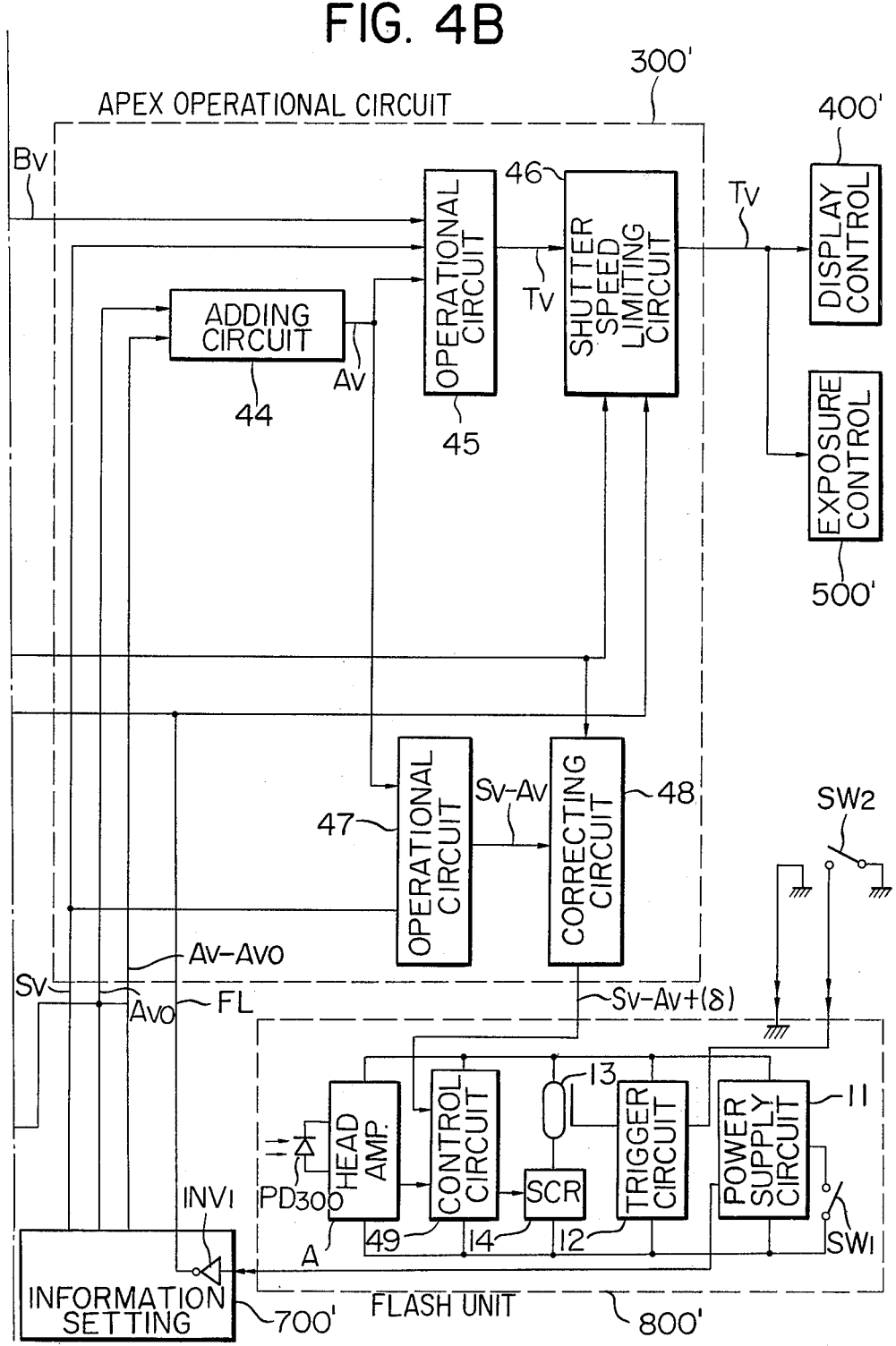

Now FIG. 4 shows a second embodiment of the present invention adapted for use in a camera with an aperture-priority automatic exposure control, wherein the same components as those in FIG. 3 are represented by same numbers or symbols.

The light-metering circuit 100 and the multiple metering operational circuit 200 are constructed in the same manner as shown in FIG. 3.

An information setting unit 700' generates the film sensitivity signal Sv, lens full-aperture signal $Av_0$, aperture step signal $(Av-Av_0)$ and flash setting signal FL.

In an APEX operational circuit 300', an adding circuit 44 adds the lens full-aperture signal $Av_0$ and the aperture step signal $(Av-Av_0)$ from the information setting unit 700', thus generating a diaphragm aperture controlling signal Av. An operational circuit 45 receives said signal Av, the luminance signal Bv (i.e. PH, Pmean or PL) from the multiple metering operational circuit 200 and the film sensitivity signal Sv from the information setting unit 700′, and conducts the following calculation:

$$Bv + Sv - Av = Tv \qquad (18)$$

thereby generating a shutter speed controlling signal Tv. A shutter speed limiting circuit 46 receives said shutter speed controlling signal Tv, output signal from the comparator circuit 28 and flash setting signal FL from the information setting unit 700′, and transmits said shutter speed controlling signal Tv to a display control unit 400′ and an exposure control unit 500′ in case the flash setting signal FL is at the H-level indicating that the flash unit is not in use, whereby said display control unit 400′ and exposure control unit 500′ perform the display and control of the shutter speed according to said shutter speed controlling signal Tv.

In the normal flash exposure mode, the flash setting signal FL is at the L-level, thus providing an L-level signal also from the comparator circuit 28. In this case the shutter speed limiting circuit 46 selects a shutter speed Tvx synchronizable with the flash. On the other hand, in the daylight flash exposure mode, the output signal from the comparator circuit 28 is inverted to the H-level. In such situation, the shutter speed limiting circuit 46 limits the shutter speed to a range from Tvx to Tvth, since an exposure longer than Tvth, which is in a range of 1/15–1/30 sec., may cause blurring of the image.

An operational circuit 47 receives the film sensitivity signal Sv from the information setting unit 700′ and the selected diaphragm aperture signal Av from the adding circuit 44 and generates a signal (Sv−Av) by a calculation:

$$(Sv) - (Av) = (Sv - Av) \qquad (19)$$

A correcting circuit 48 receives the output signal (Sv-Av) from the operational circuit 47 and the output signal from the comparator circuit 28. In the normal flash exposure mode where the output signal from the comparator circuit 28 is at the L-level, said correcting circuit 48 transmits the output (Sv-Av) of the operational circuit 47 to a flash unit 800′ without any change. Also in the daylight flash exposure mode where the output signal of the comparator circuit 28 is at the H-level, the correcting circuit 48 performs a correction on the output signal (Sv-Av) of the operational circuit 47 according to the following equation:

$$(Sv - Av) + \delta = (Sv - Av + \delta) \qquad (20)$$

and transmits the thus corrected signal to the flash unit 800′.

In contrast to the flash unit 800 shown in FIG. 3 wherein the flash is controlled by the through-the-taking-lens system with the measurement of the light reflected by the photographic film, the flash unit 800′ shown in FIG. 4 is of an external light control system and is further provided with a head amplifier A and a control circuit 49. Said head amplifier A comprises a photosensor element PD300 mounted in the flash unit 800′ for generating a light-metering output signal. Said control circuit 49 receives said output signal from the head amplifier A and the output signal from the correcting circuit 48. Simultaneously with the discharge through the flash tube 13 by the closing of the synchronizing switch Sw2, the control circuit 49 initiates the integration of the output signal from the head amplifier A, and supplies a flash terminating signal to the SCR circuit 14 to terminate the flash from the flash tube 13, when the amount of flash reaches a determined value. Also in the daylight flash exposure mode, the correcting circuit supplies the control circuit 49 with a signal (Sv−Av+δ) instead of the signal (Sv-Av) in the normal flash exposure mode, thus generating the flash terminating signal earlier corresponding to δ and terminating the flash earlier.

The comparator circuit 28 for identifying the daylight flash exposure mode and the correcting circuit 37 for making the correction δ for the film sensitivity in the daylight flash exposure mode may be incorporated in the flash unit 800.

Furthermore the present invention is also applicable to a camera integrated with the flash unit.

I claim:

1. An exposure control device for photographing an object field to be illuminated by a flash unit, comprising:
   (a) means for measuring luminances in plural areas divided in said object field and generating electric output signals corresponding to the luminances in said areas;
   (b) first comparator means for extracting maximum and minimum output signals from said electric output signals, comparing the difference of said maximum and minimum output signals with a reference value and generating an output signal in case said difference is smaller than said reference signal;
   (c) means for releasing an output signal upon detection in advance that a flash is to be given by said flash unit at said photographing;
   (d) second comparator means for comparing the luminance measured in said object field with a determined value and generating an output signal in case said luminance is substantially larger than said determined value;
   (e) means for forming a light-metering output signal from said electric output signals, said means comprising means for producing a first light-metering output signal upon the simultaneous reception of the output signals from said first comparator means and said flash detecting means for giving an appropriate exposure to the areas of relatively low luminances in said plural areas; and
   (f) means for controlling the exposurein accordance with said first light-metering output signal in response to the output signal from said second comparator means.

2. An exposure control device according to claim 1, wherein said means for forming the light-metering output signal further comprises means for forming a second light-metering output signal for giving an appropriate exposure to the mean luminance in said object field and means for forming a third light-metering output signal for giving an appropriate exposure to the areas of relatively high luminances in said plural areas.

3. An exposure control device according to claim 2, wherein said first light-metering output signal producing means comprises gate means which is adapted to transmit said first light-metering output signal and intercepts said second and third light-metering output signals upon simultaneous reception of the output signals from said detecting means and from said first comparator means.

4. An exposure control device according to claim 1, wherein said second comparator means comprises means for comparing the maximum value of said electric output signals with another reference value.

5. An exposure control device according to claim 1, wherein said means for forming the light-metering output signal further comprises means for forming a second light-metering output signal corresponding to the mean luminance in said object field, and said comparator means comprises means for comparing said second light-metering output signal with another reference value.

6. An exposure control device for photographing an object field to be illuminated by a flash unit, comprising:
(a) means for measuring luminances in plural areas divided in said object field and generating electric output signals corresponding to the luminances in said areas;
(b) means for forming plural light-metering output signals from said electric output signals for giving appropriate exposures to the areas of different luminances in said plural areas;
(c) first comparator means for extracting maximum and minimum output signals from said electric output signals and comparing the difference of said maximum and minimum output signals with a first reference value;
(d) means for detecting in advance that a flash is to be given by said flash unit at said photographing;
(e) second comparator means for comparing the luminance measured in said object field with a determined value; and
(f) exposure control means for selecting one of plural light-metering output signals in response to said first and second comparator means and from said detecting means controlling the exposure in response to thus selected light-metering output signal.

7. An exposure control device according to claim 6, wherein said means for forming the light-metering output signals comprises means for forming a first light-metering output signal for giving an appropriate exposure to the areas of relatively low luminances in said plural areas, means for forming a second light-metering output signal for giving an appropriate exposure to the mean luminance in said object field and means for forming a third light-metering output signal for giving an appropriate exposure to the areas of relatively high luminances in said plural areas.

8. An exposure control device according to claim 7, wherein said exposure control means comprises gate means adapted to transmit said first light-metering output signal and intercept said second and third light-metering output signal in case the output signals from said detecting means and from said first and second comparator means are simultaneously supplied to said exposure control means.

9. An exposure control device according to claim 6, wherein said second comparator means comprises means for comparing the maximum value of said electric output signals with another reference value.

10. An exposure control device according to claim 6, wherein said means for forming the light-metering output signals comprises means for forming one output signal corresponding to the mean luminance in said object field, and said comparator means comprises means for comparing said one output signal with another reference value.

11. A camera capable of photographing an object field including a principal object and a background to be illuminated by a flash unit, comprising:
light-metering means for measuring the luminance of the object field and forming a light-metering output signal;
exposure control means for controlling the exposure;
first means for producing an output for operating said exposure control means in response to said light-metering output signal in order to provide an appropriate exposure to said background;
second means for producing an output for operating said exposure control means to be synchronized with the flash of said flash unit;
means for controlling the flash from said flash unit in order to provide an appropriate exposure to said principal object;
comparator means for comparing said light-metering output signal with a reference value and generating a high-luminance signal upon detecting that the luminance of said object field is higher than a determined luminance or a low-luminance signal upon detection that the luminance of said object field is lower than said determined luminance;
detecting means for generating an output signal upon detection in advance that a flash is to be given by said flash unit at said photographing; and
means for controlling said exposure control means and said flash control means in such a manner as to enable an exposure with flash through simultaneous function of said first means and said flash control means upon simultaneous reception of said high-luminance signal and the output signal from said detecting means, and to enable an exposure with flash through simultaneous function of said second means and said flash control means upon simultaneous reception of said low-luminance signal and the output signal from said detecting means.

12. A camera according to claim 11, wherein said control means comprises means for enabling said exposure control means to respond to said light-metering output signal in response to the output signal from said detecting means and to said high-luminance signal.

13. A camera according to claim 11, wherein said flash control means comprises a photoelectric converting element for receiving the light from the object field during the period of said flash, and means for integrating the electric output signal from said photoelectric converting element and generating a flash terminating signal when said integration reaches a determined value.

14. A camera according to claim 11, wherein said light-metering means is adapted to measure the luminances in plural areas divided in the object field and generating plural photoelectric output signals corresponding to the luminances of said areas.

15. A camera according to claim 14, wherein said comparator means is adapted to respond to the output signal from said detecting means and to generate said high-luminance signal in case the maximum value of said photoelectric output signals is larger than said reference value or a low-luminance signal in case said maximum value is smaller than said reference value.

16. A camera according to claim 14, wherein said comparator means is adapted to response to the output signal from said detecting means and to generate said high-luminance signal in case the mean value of said plural photoelectric output signals is larger than said reference value or a low-luminance signal in case said mean value is smaller than said reference value.

17. A camera provided with a flash unit and control means for controlling the flash from said flash unit in order to photograph a principal object in the object field with an appropriate exposure, comprising:
    (a) detecting means for generating an output signal upon detection in advance that a flash is to be given by said flash unit at said photographing;
    (b) light-metering means for measuring the luminance of said object field;
    (c) means for comparing the luminance measured in said object field with a determined value and generating an output signal in case said luminance is substantially larger than said determined value; and
    (d) means for correcting the amount of said flash upon simultaneous reception of the output signals from said detecting means and said comparator means.

18. A camera according to claim 17, wherein said correcting means is adapted to reduce the amount of flash from said flash unit by a determined amount.

19. A flash photography system comprising:
    (a) flash means for emitting a flash light to illuminate an object field;
    (b) control means for controlling the amount of said flash light emitted from said flash means in order to photograph a principal object in the object field with an appropriate exposure;
    (c) detecting means for generating an output signal upon detection in advance that said flash light is to be emitted by said flash means at said photographing;
    (d) light-metering means for measuring the luminance of said object field;
    (e) means for comparing the luminance measured in said object field with a determined value and generating an output signal in case said luminance is substantially larger than said determined value; and
    (f) means for correcting the amount of said flash light upon simultaneous reception of the output signals from said detecting means and said comparator means.

* * * * *

UNITED STATES PATENT AND TRADEMARK OFFICE
CERTIFICATE OF CORRECTION

PATENT NO. : 4,429,969
DATED : February 7, 1984
INVENTOR(S) : TAKASHI SAEGUSA

It is certified that error appears in the above-identified patent and that said Letters Patent is hereby corrected as shown below:

Column 2, line 30, "falsh" should be --flash--.
Column 9, line 26, "falsh" should be --flash--.
Column 11, line 38, "At the" should be --The--.
Column 12, line 36, "is" should be --as--.
Column 14, line 47, "exposurein" should be --exposure in--.
Column 15, line 52, "signal" should be --signals--.
Column 16, line 66 (Claim 16, line 2) "response" should be --respond--.

Signed and Sealed this

Eighth Day of May 1984

[SEAL]

Attest:

GERALD J. MOSSINGHOFF

Attesting Officer

Commissioner of Patents and Trademarks